United States Patent
Ahsan et al.

(10) Patent No.: US 7,338,993 B2
(45) Date of Patent: *Mar. 4, 2008

(54) FLAME-RETARDANT MOLDING COMPOSITIONS

(75) Inventors: Tanweer Ahsan, Olean, NY (US); Charles N. Volante, Allegany, NY (US); Charles S. Bischof, Allegany, NY (US)

(73) Assignee: Henkel Corporation, Rocky Hill, CT (US)

( * ) Notice: Subject to any disclaimer, the term of this patent is extended or adjusted under 35 U.S.C. 154(b) by 141 days.

This patent is subject to a terminal disclaimer.

(21) Appl. No.: 11/130,489

(22) Filed: May 17, 2005

(65) Prior Publication Data

US 2005/0209378 A1    Sep. 22, 2005

Related U.S. Application Data

(63) Continuation of application No. 10/426,374, filed on Apr. 30, 2003, now Pat. No. 6,936,646.

(51) Int. Cl.
    *C08K 5/3495* (2006.01)
(52) U.S. Cl. ............ 524/101; 524/404; 524/432; 524/436; 524/437; 524/457; 524/461
(58) Field of Classification Search ........ 524/101, 524/404, 432, 436–437, 457, 461
    See application file for complete search history.

(56) References Cited

U.S. PATENT DOCUMENTS

| 5,439,957 | A | 8/1995 | Takimoto et al. |
| 5,648,436 | A | 7/1997 | Janowitz et al. |
| 5,739,187 | A | 4/1998 | Asano et al. |
| 6,103,797 | A | 8/2000 | Klatt et al. |
| 6,207,735 | B1 * | 3/2001 | Kuma et al. ............... 524/100 |
| 6,420,459 | B1 | 7/2002 | Horold |
| 6,660,811 | B2 * | 12/2003 | Ogura et al. ............... 525/523 |
| 2003/0092802 | A1 | 5/2003 | Nakacho et al. |
| 2003/0108746 | A1 | 6/2003 | Laminate Systems Corp et al. |
| 2003/0125433 | A1 | 7/2003 | Tamura et al. |
| 2003/0201548 | A1 | 10/2003 | Ikezawa et al. |

FOREIGN PATENT DOCUMENTS

| EP | 629 665 | 12/1994 |
| EP | 978 542 | 2/2000 |
| JP | 09-040752 | * 2/1997 |
| JP | 10060229 | 3/1998 |
| JP | 11100492 | 4/1999 |

OTHER PUBLICATIONS

Merriam-Webster's Colligiate Dictionary, Tenth Edition, p. 374, Merriam-Webster, Incorporated, Springfield, Massachusets USA (1997).*

* cited by examiner

*Primary Examiner*—Peter Szekely
(74) *Attorney, Agent, or Firm*—Steven C. Bauman

(57) ABSTRACT

A flame-retardant molding composition that includes an epoxy resin, melamine cyanurate, and one or more hydrated metal salts capable of liberating water when heated. The hydrated metal salt may include one or more compounds selected from metal borate salts, Group IIB oxides, and polyhydroxides of one or more elements selected from Group IIA elements and Group IIIB elements. The molding composition may be used to coat an electrical or electronic device by heating the molding composition to a temperature sufficient to cure the molding composition and form a polymer on the surface of the device. Electrical and electronic devices formed by the method are also disclosed.

23 Claims, No Drawings

FLAME-RETARDANT MOLDING COMPOSITIONS

CROSS-REFERENCE TO RELATED APPLICATIONS

This application continues from U.S. patent application Ser. No. 10/426,374 filed Apr. 30, 2003 now U.S. Pat. No. 6,936,646.

BACKGROUND OF THE INVENTION

1. Field of the Invention

The present invention relates to molding compounds for electrical and electronic devices, particularly epoxy-based compounds exhibiting flame resistance, moisture resistance, and low warpage and shrinkage.

2. Brief Description of Related Technology

Epoxy resins are widely used in molding compounds for coating electrical and electronic devices. Such epoxy molding compounds used for encapsulation are generally prepared from a blend of an epoxy resin and phenol hardener, along with other ingredients including fillers, catalysts, flame-retardant materials, processing aids, and colorants. Epoxy resins in such molding compounds are traditionally diepoxides which include two epoxy groups per molecule, which are reacted with a co-reactant (cross-linking agent or hardener) consisting of acid dianhydride, diamine, or diphenol oligomers. Diphenol oligomers, such as those derived from novolac phenols, cresol phenols and bisphenol A, are particularly preferred in the art as hardeners due to their high reliability.

Flame-retardants in epoxy compositions are typically provided for safety purposes. A common flame-retardant system is a combination of bromine-containing flame-retardants and antimony oxide flame-retardant synergists. However, these compounds are pollutants of the environment. Some bromine-containing flame-retardants (especially brominated diphenyl ethers) are toxic and possibly carcinogenic. Antimony trioxide is classified by the International Agency for Research on Cancer as a Class 2B carcinogen (i.e., antimony trioxide is a suspect carcinogen based mainly on animal studies). In addition, this compound is often used at a relatively high level (2-4%) and is also slightly water-soluble, leading to further environmental concerns. This concern is highlighted by the fact that integrated circuit manufacturers currently discard up to one half of the total amount of molding compositions used.

Phosphorus-containing compounds have been proposed as flame-retardants. For example, U.S. Pat. No. 5,739,187 to Asano et al. discloses epoxy resin compositions as semiconductor encapsulants, which include a phosphorus-containing flame-retardant to eliminate the use of antimony trioxide and brominated compounds. However, molding compositions containing conventional phosphorus compounds generally possess undesirable properties such as high moisture absorption, which can cause stress and cracking of the encapsulant at elevated temperatures.

Melamine cyanurate is commonly sold as a flame-retardant compound. Although effective as a flame-retardant, high levels of this material oftentimes severely reduce the flowability of molding compounds. As a result, it has generally been considered impractical to incorporate melamine cyanurate into molding compounds at appropriate levels to achieve both adequate flame retardancy and flowability.

Unfortunately, reducing the amount of the flame-retardant to address the flowability issues compromises flame retardance, with the resulting molding compounds failing to meet the flame retardance standard, UL-94 V-O rating.

It would be desirable to provide new flame-retardant molding compositions that overcome these, while providing commercially acceptable physical properties. Moreover, it would be desirable to provide molding compositions with excellent stress characteristics such as low warpage and shrinkage with improved flowability upon curing.

SUMMARY OF THE INVENTION

The present invention provides a flame-retardant molding composition substantially free of elemental halogen, phosphorus, and antimony, that includes an epoxy resin, melamine cyanurate, and one or more hydrated metal salts capable of liberating water when heated. In an embodiment of the invention, the hydrated metal salt may include one or more compounds selected from metal borate salts, Group IIIB oxides, and polyhydroxides of one or more elements selected from Group IIA elements and Group IIIB elements.

The present invention is also directed to a method of coating an electrical or electronic device. The inventive method includes heating the above-described molding composition to a temperature sufficient to cure the molding composition and form a polymer on the surface of the device. The present invention is further directed to electrical and electronic devices formed by the present method.

Other features and advantages of the invention will be apparent from the description of the preferred embodiments thereof and from the claims.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

As used herein the term "cured" is meant to indicate a three-dimensional crosslink network formed by covalent bond formation, e.g., between the functional groups of the hardener and the epoxy groups of the resin. The temperature at which the composition of the present invention cures is variable, and depends in part on the conditions and the type and amount of catalyst, if any is used.

As used herein the term "hydrated metal salts" is meant to indicate metal salts that contain water in the form of water of crystallization, i.e. water present in metal salt crystals in definite proportions, such as water molecules that occupy lattice positions in the metal salt crystals. Hydrated metal salts useful in the present invention liberate at least a portion of the water they contain when heated.

The present invention is directed to a flame-retardant molding composition that is substantially free of elemental halogen, phosphorus, and antimony. The inventive molding composition includes an epoxy resin, melamine cyanurate, and one or more hydrated metal salts capable of liberating water when heated.

There is no restriction on the type of epoxy resin that can be used in the molding compositions. Desirably, the epoxy resin contains two or more reactive oxirane groups. For example, the epoxy resin may be selected from, but not limited to, bisphenol A type epoxy resins; novolac type epoxy resins, such as epoxy cresol novolac resin and phenolic novolac epoxy resin; alicyclic epoxy resins; glycidyl type epoxy resins; biphenyl epoxy resins; naphthalene ring-containing epoxy resins; cyclopentadiene-containing epoxy resins; polyfunctional epoxy resins; hydroquinone epoxy resins; and stilbene epoxy resins. The molding compositions can include more than one epoxy resin; for example, a combination of epoxy cresol novolac resin and biphenyl epoxy resin.

As noted, bisphenol and biphenyl epoxy resins, which are traditionally referenced as di-epoxies, and epoxy cresol novolac resins, which are traditionally referenced as multifunctional epoxies, are useful in the present invention. Such epoxies have a degree of branching of two, in that two phenolic groups having pendant epoxies are linked through the same carbon atom. For example, diglycidyl ether of bisphenol A is difunctional, including two phenolic groups with pendant epoxies extending from a central carbon atom. It therefore has a degree of branching of two. Epoxy cresol novolac resins are oftentimes referenced as "multifunctional," in that they are polymeric compounds with a plurality of pendant epoxy moieties which may extend from the polymeric chain. For example, epoxy cresol novolac resins include the following structure:

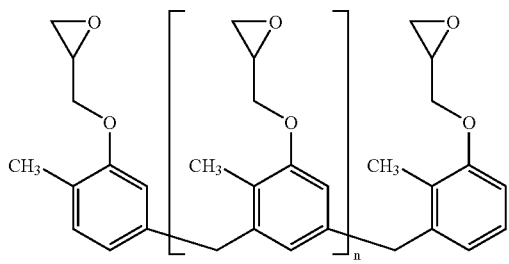

In the instance where n=0, the functionality of this structure would be 2. If n=1, the functionality, is 3; if n=4, the functionality is 6; etc. As such, this compound is traditionally referred to as a multifunctional epoxy resin. However, since only two phenolic groups extend from the same carbon or small cluster of carbons, the degree of branching of this type of resin would be equal to two.

In a particularly desirable embodiment, the epoxy resin is a multifunctional epoxy resin having a degree of branching within the resin backbone of at least three. Thus, particularly desirable multifunctional epoxy resins are those derived from phenol, and which include at least three phenolic groups branching directly from the same central carbon atom or central cluster of carbons, with a pendant oxirane group linked to each of the at least three phenolic groups.

Non-limiting examples of useful multifunctional epoxy resins having a degree of branching of at least three include:

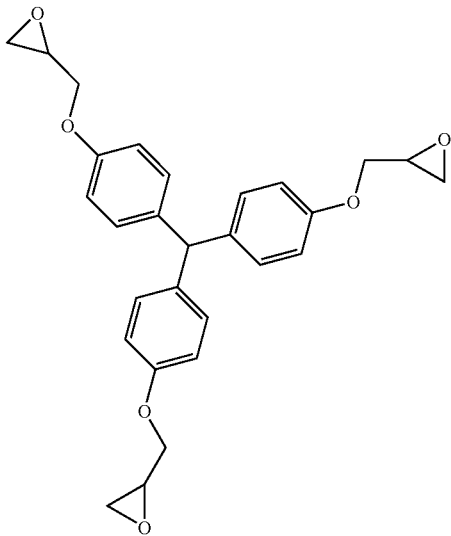

triphenylol methane triglycidyl ether (having a degree of branching of three, represented by three terminal glycidyl ether moieties branching from a central carbon atom); and

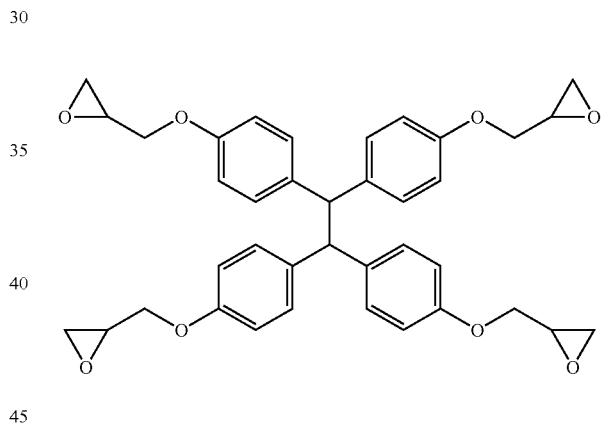

tetra glycidyl ether of tetra phenol ethane (having a degree of branching of four, represented by four terminal glycidyl ether moieties branching from a central two carbon cluster ethyl moiety).

Particularly desirable are epoxy resins derived from trisphenolmethane, such as triphenylol methane triglycidyl ether.

The multifunctional resin having a degree of branching of at least three may be used alone, or in combination with conventional resins such as those described above.

The epoxy resin typically has a theoretical epoxy equivalent weight of about 150 to 250.

The present molding composition contains the epoxy resin at a level of at least 1 percent, in some case at least 4 percent, in other cases at least 5 percent, and in some situations at least 5.5 percent by weight of the molding composition. Also, the epoxy resin is present in an amount of up to 12 percent, in some cases up to 11 percent, in other cases up to 9 percent and in some situations up to 8.5 percent by weight of the molding composition. The molding composition may contain the epoxy resin in any range of values inclusive of those stated above.

A curing agent (hardener) may be included in the present molding composition. The hardener promotes crosslinking of the molding composition to form a polymer composition upon heating of the composition to a temperature of at least 135° C. Some suitable curing agents that can be included in the molding compositions of the present invention are phenol novolac type hardener, cresol novolac type hardener, dicyclopentadiene phenol type hardener, limonene type hardener, and anhydrides. Flexible hardeners having a hydroxyl equivalent weight greater than about 150 are often desirable, such as xylock novolac type hardener. Non-limiting examples of flexible hardeners include bisphenol M, commercially available from Borden Chemical, and DEH 85, commercially available from Dow Chemical. Similar to the epoxy resin component, more than one type of curing agent can be included in the molding compositions. The hardener typically has an epoxy equivalent weight of about 100 to 150.

As with the epoxy resin component, multifunctional hardeners having a degree of branching of at least three are particularly desirable in one embodiment of the present invention. Particularly desirable are those derived from tris-phenol and which contain at least three functional groups that are reactive with epoxide groups.

The present molding composition contains the hardener at a level of at least 1 percent, in some case at least 1.5 percent, in other cases at least 2 percent, and in some situations at least 2.5 percent by weight of the molding composition. Also, the hardener is present in an amount of up to 10 percent, in some cases up to 9 percent, in other cases up to 8 percent and in some situations up to 6 percent by weight of the molding composition. The molding composition may contain the hardener in any range of values inclusive of those stated above.

The composition may, optionally, also include a catalyst for promoting reaction of the epoxy resin and the hardener. Traditionally, such epoxy compositions incorporate catalysts such as tertiary amines, substituted phosphines, salts of quaternary organophosphonium compounds, imidazoles, and the like, with compounds such as 1,8-diazabicyclo[5.4.0]undec-7-ene ("DBU"), dicyandiamide ("DICY") and triphenylphosphine ("TPP") being particularly well known for use as catalysts. Salts of quaternary organophosphonium compounds which may be used include, but are not limited to, organophosphonium functional acetic acid ester compounds, such as ethyltriphenylphosphonium acid acetate complex ("EtTPPOAc"), commercially available from Rohm and Haas.

In addition, the composition of the present invention further includes components specifically designated for imparting flame retardancy to the composition. One component included in the composition to impart flame retardancy is melamine cyanurate. Additionally, the present molding composition includes hydrated metal salts that liberate water when heated. In an embodiment of the present invention, water is liberated from the hydrated metal salts when they are heated above 100° C., in some cases when heated above 125° C., and in other cases when heated above 150° C. While not being limited to a single theory, it is believed that the liberation of water from the hydrated metal salts helps to provide flame retardancy properties to the present molding composition.

Any suitable hydrated metal salts may be used in the present invention. In an embodiment of the present invention, the suitable hydrated metal salts include, but are not limited to, metal borate salts, Group IIIB oxides, and polyhydroxides of one or more elements selected from Group IIA elements and Group IIIB elements.

As a non-limiting example, the metal borate salts may include zinc borate. As a further non-limiting example, the Group IIIB oxides may include zinc oxide. In an additional non-limiting example, the polyhydroxides may include one or both of aluminum trihydrate ($Al(OH)_3$) and magnesium hydroxide ($Mg(OH)_2$).

The present molding composition contains melamine cyanurate at a level of at least 0.1 percent, in some case at least 0.25 percent, in other cases at least 0.5 percent, and in some situations at least 1 percent by weight of the molding composition. The melamine cyanurate is present at a level sufficient to impart the desired fire retardancy properties. Also, melamine cyanurate is present in an amount of up to 4 percent, in some cases up to 3.5 percent, in other cases up to 3 percent, and in some situations up to 2.5 percent by weight of the molding composition. If the amount of melamine cyanurate is too high, the viscosity of the molding composition may be too high and the molding composition may become difficult to handle. The molding composition may contain melamine cyanurate in any range of values inclusive of those stated above.

The present molding composition contains the metal borate salt at a level of at least 0.1 percent, in some case at least 0.2 percent, in other cases at least 0.3 percent, in some situations at least 0.4 percent, and in other situations at least 0.5 percent by weight of the molding composition. The metal borate salt is present at a level sufficient to impart the desired fire retardancy properties in combination with the melamine cyanurate. The metal borate salt is present in an amount of up to 2 percent, in some cases up to 1.75 percent, in other cases up to 1.5 percent, and in some situations up to 1 percent by weight of the molding composition. If the amount of the metal borate salt is too high, the viscosity of the molding composition may be too high and the molding composition may become difficult to handle. The molding composition may contain the metal borate salt in any range of values inclusive of those stated above.

The present molding composition may optionally contain a polyhydroxide of one or more elements selected from Group IIA elements and Group IIIB elements. When the polyhydroxide is present, it may be present at a level of at least 0.1 percent, in some case at least 0.15 percent, in other cases at least 0.2 percent, and in some situations at least 0.25 percent by weight of the molding composition. The polyhydroxide is present at a level sufficient to impart the desired fire retardancy properties in combination with the additional flame-retardant components. The polyhydroxide is present in an amount of up to 1 percent, in some cases up to 0.85 percent, in other cases up to 0.75 percent, and in some situations up to 0.5 percent by weight of the molding composition. If the amount of the polyhydroxide is too high, the viscosity of the molding composition may be too high and the molding composition may become difficult to handle. The molding composition may contain the polyhydroxide in any range of values inclusive of those stated above.

The present molding composition may optionally contain a Group IIIB metal oxide. When the metal oxide is present, it may be present at a level of at least 0.1 percent, in some case at least 0.15 percent, in other cases at least 0.2 percent, and in some situations at least 0.25 percent by weight of the molding composition. The metal oxide is present at a level sufficient to impart the desired fire retardancy properties in combination with the additional flame-retardant components. The metal oxide is present in an amount of up to 1 percent, in some cases up to 0.85 percent, in other cases up to 0.75 percent, and in some situations up to 0.5 percent by weight of the molding composition. If the amount of the metal oxide is too high, the viscosity of the molding composition may be too high and the molding composition may become difficult to handle. The molding composition may contain the metal oxide in any range of values inclusive of those stated above.

In an embodiment of the present invention, the molding composition contains an epoxy resin, melamine cyanurate, zinc borate, and a compound selected from zinc oxide, aluminum trihydrate, and/or magnesium hydroxide. In a non-limiting example of this embodiment, the melamine cyanurate is present in an amount from about 0.1 to about 3.5 percent by weight of the molding composition; zinc borate is present in an amount from about 0.1 to about 2 percent by weight of the molding composition; zinc oxide is present in an amount from about 0 to about 1 percent by weight of the molding composition; and the metal polyhydroxide is present in an amount from about 0 to about 1 percent by weight of the molding composition.

The present molding composition may include other suitable flame-retardants known in the art in addition to those set forth above. Non-limiting examples of suitable flame-retardants include, but are not limited to, transition metal oxides such as tungsten trioxide, molybdenum trioxide, zinc molybdate, calcium molybdate, and mixtures thereof. The other flame-retardant may be present in the composition of the present invention in an amount of up to about 3 percent by weight based on the total weight of the composition, optionally from about 0.4 percent by weight to about 2.8 percent by weight.

In an embodiment of the present invention, the molding composition includes melamine cyanurate in combination with zinc oxide and optionally aluminum trihydrate and/or magnesium hydroxide. In this embodiment, the amount of melamine cyanurate can be decreased below the level typically required to impart flame retardance to a molding composition, which may also serve to limit any deleterious effect in other properties which may be caused by increased levels of melamine cyanurate, such as flowability, as well as environmental concerns.

The compositions of the present invention can include other optional additives well known to those of skill on the art. For example, fillers such as silica, alumina, aluminosilicate, silicon nitride, clay, talc, mica, kaolin, calcium carbonate, wollastonite, montmorillonite, smectite, and combinations thereof are commonly present in the composition in amounts of about 20 to 90 percent by weight, often desirably from about 50 to 90 percent by weight, and more desirably from about 60 to 90 percent by weight based on the total weight of the composition.

A colorant, such as carbon black colorant, may be included in the composition of the present invention in amounts of about 0 to about 2 percent by weight, more often, from about 0.1 to about 1 percent by weight, when present.

A mold release agent, such as carnauba wax, paraffin wax, polyethylene wax, ester waxes (such as EWAX commercially available from Hoechst Chemical), acid waxes (such as SWAX commercially available from Hoechst Chemical), glycerol monostearate, and metallic stearates, may be included in the composition of the present invention in amounts of from about 0 to about 2 percent by weight, more often, from about 0.2 to about 1 percent by weight, when present.

A coupling agent, such as a silane type coupling agent, may be included in the composition of the present invention in amounts of from about 0 to about 2 percent by weight, more often from about 0.3 to about 1 percent by weight, when present.

Ion scavengers, such as magnesium aluminum carbonate hydrate, which can be obtained commercially from Kyowa Chemical Industry Co. under the trade name "DHT-4A," are suitable for use in the composition of the present invention and may be present in amounts of from about 0 to about 2 percent by weight, more often from about 0.5 to about 2 percent by weight, when present.

Examples of other additives may include stress relievers, such as polyphenyleneoxide; elastomers, such as powdered silicone; and adhesion promoters, such as azine adhesion promoters, which may be present in amounts of from about 0 to about 3 percent by weight, when present.

Auxiliary catalysts, such as 1,8-diazabicyclo[5.4.0]undecene-7 (DBU), triphenylphosphine (TPP), dicyandiamide (DICY) and 2-methylimidazole, are suitable for use in the composition of the present invention and may be present in amounts of from about 0 to about 10 percent by weight, more often from about 0.5 to about 2 percent by weight, when present.

In a particular embodiment of the present invention, the molding composition includes about 4 wt. % to about 12 wt. % of an epoxy resin, about 0.1 wt. % to about 3.5 wt. % of melamine cyanurate, about 0.1 wt. % to about 2 wt. % of zinc borate, about 0.01 wt. % to about 1 wt. % of a compound selected from one or more of zinc oxide and a metal polyhydroxide comprising one or both of aluminum trihydrate and magnesium hydroxide, about 0.001 wt. % to about 10 wt. % of a phenolic novolac hardener, 0 wt. % to about 90 wt. % of one or more solvents, and about 0.1 wt. % to about 10 wt. % each of one or more other additives. The other additives may include, but are not limited to, colorants, mold release agents, coupling agents, catalysts, ion scavengers, metal oxides, metal hydroxides, pigments, adhesion promoters, toughening agents, UV absorbers, and antioxidants.

The molding compositions can be prepared by any conventional method. For example, as is known in the art, all of the compounds may be combined and finely ground and dry blended, or the components can be mixed in a step-wise fashion to enhance homogeneous mixing. The mixture can then be treated on a hot differential roll mill, such as with a large two-roll mill (one roll heated to about 90° C., and the other cooled with tap water), to produce uniform sheets, which are then ground to a powder after cooling. Alternatively, the mixture can be extruded through a twin screw extruder, as known in the art.

The present invention is also directed to a method of coating an electrical or electronic device by heating the above-described molding composition to a temperature sufficient to cure the molding composition and form a polymer on the surface of the device. The molding compositions can be molded into various articles by any conventional method, e.g., by using a molding apparatus, such as a transfer press equipped with a multi-cavity mold for coating electronic devices. Suitable molding conditions include a temperature of about 150° C. to about 200° C., in some cases about 165° C. to about 195° C., and in other cases about 175° C. to about 195° C. and a pressure of about 400 psi to about 1,500 psi.

The preferred molding compositions cure in about 0.5 minute to about 3 minutes, more preferably, about 1 minute to about 2 minutes. To determine the time for curing (i.e., minimum time needed for forming a good cull cure), the molding composition is placed in the mold press at 190° C. and is inspected after a pre-set period of time (e.g., 3 minutes). If a good cure (i.e., strong and not brittle) is formed, the experiment is repeated with a shorter period of press time until the minimum time period is determined.

The molding compositions of the present invention typically demonstrate a flammability rating of UL 94V-1, more preferably, a flammability rating of UL 94V-0. The UL 94 ratings are generally accepted flammability performance standards for materials. They are intended to provide an indication of a material's ability to extinguish a flame, once ignited. Several ratings can be applied based on the rate of burning, time to extinguish, ability to resist dripping, and whether or not drips are burning. The ratings are determined by measuring the total burn time of a ⅛" bar according to the UL 94 flammability test. A 94V-0 indicates that burning stops within 10 seconds on a vertical specimen with no drips allowed. A 94V-1 rating requires that burning stops within 30 seconds on a vertical specimen with no drips allowed.

As noted above, in a particular embodiment of the invention, the epoxy resin is a multifunctional epoxy resin having a degree of branching within the resin backbone of at least three, and the crosslinking agent is a multifunctional hardener derived from phenol and having a degree of branching of at least three. Particularly desirable epoxy resins are tris-phenolmethane derived resins, such as triphenolyl methane triglycidyl ether, and particularly desirable hardeners are tris-phenolmethane derivatives. Examples of useful resins include 1-trishydroxyphenylmethane glycidyl ether, such as SUMIEPOXY TMH574, commercially available from Sumitomo Corp., and EPPN 501H, commercially available from Nippon Kayaku. An example of a useful hardener is MEH 7500, commercially available from Meiwa Kasei K.K.

A particular advantage of the inventive flame retardant molding composition is that commercially desirable flame retardant properties can be achieved with little or no adverse impact on flow properties. The inventive combination allows for significantly less melamine cyanurate to be used, which enables excellent flowability of the molding composition, while the flame retardant properties are improved. As a non-limiting example, when the weight ratio of melamine cyanurate to hydrated metal salts is from 2:1 to 4:1, and in some cases 3:1, significantly lower levels of melamine cyanurate are required and the molding composition exhibits excellent flow and flame retardant properties. As an non-limiting extension of this embodiment, the synergistic properties of the inventive combination are found when the hydrated metal salts are selected from zinc oxide, zinc borate, Mg(OH)$_2$ and AL(OH)$_3$.

As noted above, the compositions of the present invention are particularly useful as molding compounds for electrical or electronic devices. In a further embodiment, the present invention provides a method for coating an electrical or electronic device. Non-limiting examples of such electrical or electronic devices include semiconductors, transistors, diodes, and integrated circuits. The method involves providing a molding composition as discussed above, and contacting a surface of an electronic device with the molding composition, such as by coating the composition thereon. The device including the molding composition thereon is then heated to a temperature sufficient to cure the molding composition and form a polymer on the surface of the device. Desirably, the temperature to which the molding composition is heated is typically at least 135° C., often about 165° C. to 195° C.

The invention will now be described by the following examples. The examples are intended to be illustrative only and are not intended to limit the scope of the invention.

EXAMPLES

The following examples of molding compositions were prepared by dry blending all of the components simultaneously and testing the compositions.

Example 1

Seven molding compositions represented as Samples 1-7 were prepared according to the formulations as indicated in Table 1 below. Each molding composition contained an epoxy cresol novolac resin with a standard phenol novolac flexible hardener. With the exception of Comparative Sample 1, each composition contained melamine cyanurate, zinc borate, zinc oxide and, optionally, magnesium hydroxide as a flame-retardant formulation. The weight % (wt. %) indicated below were calculated based on the total weight of the compositions.

TABLE 1

| | SAMPLE NO. | | | | | | |
| --- | --- | --- | --- | --- | --- | --- | --- |
| COMPONENTS | 1 (comparative) | 2 | 3 | 4 | 5 | 6 | 7 |
| Silica Filler (wt. %) | 79.85 | 78.85 | 79.05 | 79.05 | 79.35 | 79.45 | 79.55 |
| Epoxy Cresol Novolac Resin (wt. %) | 7.28 | 7.28 | 7.28 | 7.28 | 7.28 | 7.28 | 7.28 |
| Phenol Novolac Hardener (wt. %) | 6.59 | 6.59 | 6.59 | 6.59 | 6.59 | 6.59 | 6.59 |
| Carbon Black Colorant (wt. %) | 0.30 | 0.30 | 0.30 | 0.30 | 0.30 | 0.30 | 0.30 |
| Polyphenyleneoxide Stress Reliever (wt. %) | 0.8 | 0.8 | 0.8 | 0.8 | 0.8 | 0.8 | 0.8 |
| Ion Scavenger (wt. %) | 0.3 | 0.3 | 0.3 | 0.3 | 0.3 | 0.3 | 0.3 |
| Amine Catalyst (wt. %) | 0.18 | 0.18 | 0.18 | 0.18 | 0.18 | 0.18 | 0.18 |
| Melamine Cyanurate (wt. %) | 3.0 | 3.0 | 2.8 | 3.0 | 3.0 | 2.9 | 2.8 |
| Zinc Oxide (wt. %) | 0.40 | 0.40 | 0.40 | 0.40 | 0.40 | 0.40 | 0.40 |
| Zinc Borate (wt. %) | — | 1.0 | 0.5 | 0.5 | 0.5 | 0.5 | 0.5 |
| Mg(OH)$_2$ (wt. %) | — | — | 0.5 | 0.3 | — | — | — |
| Carnauba Wax (wt. %) | 0.57 | 0.57 | 0.57 | 0.57 | 0.57 | 0.57 | 0.57 |
| Silane Couple Agents (wt. %) | 0.73 | 0.73 | 0.73 | 0.73 | 0.73 | 0.73 | 0.73 |

Each of the molding compositions of Samples 1-7 were cured and tested for flammability, gel time, spiral flow, total burn time and UL 94 rating, with the results shown in Table 2. The flammability properties of the cured compositions were determined by the total burn time of five ⅛" molded bar according to the UL 94 test. Gel time was determined through a standard testing procedure in which the compound is placed on a thermostatically-controlled hot plate, which is controlled at a specified temperature. The compound is stroked with a spatula in a back-and-forth motion until it becomes stiff, with the time to stiffness representing the gel time.

Spiral flow, using ASTM D-3123, was determined by flowing a sample of the composition through a semicircular spiral mold in a transfer molding press at 175° C. until the flow ceased. When the mold cycle is complete, the mold is opened and the point of farthest continuous flow is recorded.

TABLE 2

| TEST PROCEDURE | SAMPLE NO. | | | | | | |
|---|---|---|---|---|---|---|---|
| | 1 (comparative) | 2 | 3 | 4 | 5 | 6 | 7 |
| Flammability Test (UL 94) | | | | | | | |
| Total Burn Time (sec) | Total Burn | 15.5 | 15 | 6.5 | 7.5 | 11.5 | 15.5 |
| UL 94 Rating | HB[1] | V-0[2] | V-0[2] | V-0[2] | V-0[2] | V-0[2] | V-0[2] |
| Gel Time (sec) | 19 | 19 | 18.5 | 18.5 | 18 | 18.5 | 18.5 |
| Spiral Flow (inches) | 39 | 39 | 39 | 38 | 40 | 40 | 41 |

[1]Horizontal Burning Test-slow burning on a horizontal specimen burning rate <76 mm/min for thickness <3 mm.
[2]Burning stops within 10 seconds on a vertical specimen; no drips allowed The results of Table 2 demonstrate that molding compositions prepared with a melamine cyanurate, zinc borate, zinc oxide and, optionally, magnesium hydroxide exhibit improved flame retardancy. In particular, a comparison of Sample 1 (which represents a comparative composition prepared with only melamine cyanurate and zinc oxide) with Samples 2-7 (which represent inventive compositions prepared with melamine cyanurate, zinc borate, zinc oxide and, optionally, magnesium hydroxide) shows that Samples 2-7 have improved flammability ratings compared with Sample 1, which failed to achieve a UL94 V-O rating.

Example 2

Six molding compositions represented as Samples 8-13 were prepared according to the formulations as indicated in Table 3 below. Each molding composition contained a standard epoxy cresol novolac resin and a standard phenol novolac hardener, along with flame-retardants melamine cyanurate, zinc borate and, optionally, zinc oxide and/or magnesium hydroxide. The weight % (wt. %) indicated below were calculated based on the total weight of the compositions.

TABLE 3

| COMPONENTS | SAMPLE NO. | | | | | |
|---|---|---|---|---|---|---|
| | 8 (comparative) | 9 | 10 | 11 | 12 | 13 |
| Silica Filler (wt. %) | 80.05 | 79.95 | 79.85 | 79.65 | 79.95 | 80.20 |
| Epoxy Cresol Novolac Resin (wt. %) | 7.66 | 7.66 | 7.66 | 7.66 | 7.66 | 7.66 |
| Phenol Novolac Hardener (wt. %) | 5.11 | 5.11 | 5.11 | 5.11 | 5.11 | 5.11 |
| Carbon Black Colorant (wt. %) | 0.30 | 0.30 | 0.30 | 0.30 | 0.30 | 0.30 |
| Ion Scavenger (wt. %) | 0.8 | 0.8 | 0.8 | 0.8 | 0.8 | 0.8 |
| Polyphenyleneoxide Stress Reliever (wt. %) | 1.1 | 1.1 | 1.1 | 1.1 | 1.1 | 1.1 |
| EtTPPOAc Catalyst (wt. %) | 0.25 | 0.25 | 0.25 | 0.25 | 0.25 | 0.25 |
| Melamine Cyanurate (wt. %) | 3.0 | 3.0 | 3.0 | 3.0 | 3.0 | 3.0 |
| Zinc Oxide (wt. %) | — | 0.1 | 0.2 | 0.4 | 0.1 | 0.1 |
| Zinc Borate (wt. %) | 0.25 | 0.25 | 0.25 | 0.25 | 0.25 | 0.25 |
| Mg(OH)$_2$ (wt. %) | 0.25 | 0.25 | 0.25 | 0.25 | 0.25 | — |
| Waxes (wt. %) | 0.5 | 0.5 | 0.5 | 0.5 | 0.5 | 0.5 |
| Silane Couple Agents (wt. %) | 0.73 | 0.73 | 0.73 | 0.73 | 0.73 | 0.73 |

Each of the molding compositions of Samples 8-13 were cured and tested for flammability, gel time, and spiral flow in a similar manner as in Example 1, with the results shown in Table 4.

TABLE 4

| TEST PROCEDURE | SAMPLE NO. | | | | | |
|---|---|---|---|---|---|---|
| | 8 (comparative) | 9 | 10 | 11 | 12 | 13 |
| Flammability Test (UL 94) | | | | | | |
| Total Burn Time (sec) | 44.5 | 17.5 | 13.5 | 12.5 | 18 | 30 |
| UL 94 Rating | V-0[1] | V-0[1] | V-0[1] | V-0[1] | V-0[1] | V-0[1] |
| Gel Time (sec) | 25 | 25 | 26 | 26 | 25 | 25 |
| Spiral Flow (inches) | 47 | 44 | 41 | 40 | 47 | 46 |

[1]Horizontal Burning Test - burning stops within 10 seconds on a vertical specimen; no drips allowed.

The results of Table 4 demonstrate that molding compositions prepared with melamine cyanurate, zinc borate, zinc oxide and, optionally magnesium hydroxide as a flame-retardant formulation exhibit improved flame retardancy.

The present invention has been described with reference to specific details of particular embodiments thereof. It is not intended that such details be regarded as limitations upon the scope of the invention except insofar as and to the extent that they are included in the accompanying claims.

We claim:

1. A flame-retardant molding composition substantially free of halogen, phosphorus, and antimony, comprising:
   a) an epoxy resin; and
   b) a flame retardant formulation consisting essentially of:
      melamine cyanurate;
      one or more metal borate salts; and
      a compound selected from the group consisting of one or more polyhydroxides of one or more elements selected from Group IIA elements and Group IIIB elements, one or more Group IIB oxides, and mixtures thereof.

2. The molding composition of claim 1, wherein the metal borate salt comprises zinc borate.

3. The molding composition of claim 1, wherein the polyhydroxide is a metal polyhydroxide selected from the group consisting one or more aluminum trihydrate, magnesium hydroxide, and calcium hydroxide, and the Group IIB oxides comprise zinc oxide.

4. The molding composition of claim 3, wherein the metal borate salt comprises zinc borate.

5. The molding composition of claim 1, further comprising a phenolic novolac hardener.

6. The molding composition of claim 1, wherein the molding composition comprises an epoxy cresol novolac resin.

7. The molding composition of claim 6, wherein the molding composition further comprises a biphenyl epoxy resin.

8. The molding composition of claim 1, wherein the one or more metal borate salts comprises zinc borate and one or more compounds selected from the group consisting of zinc oxide and a metal polyhydroxide comprising one or both of aluminum trihydrate and magnesium hydroxide.

9. A flame-retardant molding composition substantially free of halogen, phosphorus, and antimony, consisting essentially of:

about 4 wt. % to about 12 wt. % of an epoxy resin;
about 0.1 wt. % to about 3.5 wt. % of melamine cyanurate;
about 0.1 wt. % to about 2 wt. % of zinc borate;
about 0.01 wt. % to about 1 wt. % of one or more compounds selected from the group consisting of zinc oxide and metal polyhydroxides comprising one or both of aluminum trihydrate and magnesium hydroxide;
about 0.001 wt. % to about 10 wt. % of a phenolic novolac hardener;
about 0 wt. % to about 90 wt. % of one or more solvents; and
about 0.1 wt. % to about 10 wt. % each of one or more additives selected from the group consisting of colorants, mold release agents, coupling agents, catalysts, ion scavengers, metal oxides, metal hydroxides, pigments, adhesion promoters, toughening agents, UV absorbers, and antioxidants.

10. A method of coating an electrical or electronic device, comprising heating a molding composition to a temperature sufficient to cure the molding composition and form a polymer on the surface of the device; wherein the molding composition, which is substantially free of halogen, phosphorus, and antimony, comprises:
   a) an epoxy resin;
   b) a flame retardant formulation consisting essentially of:
      a melamine cyanurate;
      one or more metal borate salts; and
      one or more compounds selected from the group consisting of zinc oxide and polyhydroxides of one or more elements selected from Group IIA elements and Group IIIB elements.

11. The method of claim 10, wherein the temperature ranges from about 165° C. to 195° C.

12. The method of claim 10, wherein the metal borate salt comprises zinc borate and wherein the polyhydroxide is a metal polyhydroxide selected from the group consisting of one or both of aluminum trihydrate and magnesium hydroxide.

13. The method of claim 10, wherein the molding composition further comprises a phenolic novolac hardener.

14. The method of claim 10, wherein the molding composition comprises an epoxy cresol novolac resin.

15. The method of claim 14, wherein the molding composition further comprises a biphenyl epoxy resin.

16. The method of claim 10, wherein the device is an electrical or electronic device.

17. The method of claim 16, wherein the electrical or electronic device is selected from a semiconductor, a transistor, a diode, or an integrated circuit.

18. An electrical or electronic device formed by the method of claim 10.

19. The molding composition of claim 1, wherein the polyhydroxide comprises one or both of aluminum trihydrate and magnesium hydroxide.

20. The molding composition of claim 1, wherein the Group IIB oxide comprises zinc oxide.

21. The molding composition of claim 1, wherein the weight ratio of melamine cyanurate in the flame retardant formulation of b) to the combination of the one or more metal borate salts and the one or more polyhydroxides and one or more Group IIB oxides is from 2:1 to 4:1.

22. The molding composition of claim 9, wherein the weight ratio of melamine cyanurate to the zinc oxide and metal polyhydroxides in combination is from 2:1 to 4:1.

23. The method of claim 10, wherein the weight ratio of melamine cyanurate in the flame retardant formulation of b) to the combination of the one or more metal borate salts and the one or more polyhydroxides and one or more Group IIB oxides is from 2:1 to 4:1.

* * * * *

UNITED STATES PATENT AND TRADEMARK OFFICE
CERTIFICATE OF CORRECTION

PATENT NO.        : 7,338,993 B2
APPLICATION NO.   : 11/130489
DATED             : March 4, 2008
INVENTOR(S)       : Ahsan et al.

Page 1 of 1

It is certified that error appears in the above-identified patent and that said Letters Patent is hereby corrected as shown below:

<u>Column 13</u>, Line 46, Claim 3, "consisting one" should read
-- consisting of one --

Signed and Sealed this

Nineteenth Day of August, 2008

JON W. DUDAS
*Director of the United States Patent and Trademark Office*